US010612964B1

(12) United States Patent
Shi et al.

(10) Patent No.: US 10,612,964 B1
(45) Date of Patent: Apr. 7, 2020

(54) SYSTEM TO MITIGATE EFFECTS OF VIBRATION ON LOAD CELL

(71) Applicant: AMAZON TECHNOLOGIES, INC., Seattle, WA (US)

(72) Inventors: Qicai Shi, Bothell, WA (US); Nathan Pius O'Neill, Snohomish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 488 days.

(21) Appl. No.: 15/387,469

(22) Filed: Dec. 21, 2016

(51) Int. Cl.
*G01G 23/00* (2006.01)
*G06Q 10/08* (2012.01)
*G01G 19/414* (2006.01)

(52) U.S. Cl.
CPC ........... *G01G 23/00* (2013.01); *G01G 19/414* (2013.01); *G06Q 10/087* (2013.01)

(58) Field of Classification Search
CPC ...................................................... G01G 23/00
See application file for complete search history.

(56) References Cited

U.S. PATENT DOCUMENTS

| | | | | |
|---|---|---|---|---|
| 5,172,783 | A * | 12/1992 | Feinland | G01G 19/005 177/185 |
| 5,561,274 | A | 10/1996 | Brandorff | |
| 6,907,409 | B1 * | 6/2005 | Huebler | G01G 19/005 177/185 |
| 7,225,980 | B2 | 6/2007 | Ku et al. | |
| 7,949,568 | B2 | 5/2011 | Fano et al. | |
| 8,009,864 | B2 | 8/2011 | Linaker et al. | |
| 8,189,855 | B2 | 5/2012 | Opalach et al. | |
| 8,630,924 | B2 | 1/2014 | Groenevelt et al. | |
| 9,235,928 | B2 | 1/2016 | Medioni et al. | |
| 9,473,747 | B2 | 10/2016 | Kobres et al. | |
| 9,911,290 | B1 * | 3/2018 | Zalewski | G07G 1/0072 |
| 9,921,641 | B1 * | 3/2018 | Worley, III | G06F 3/017 |

(Continued)

OTHER PUBLICATIONS

Asthana, et al., "An indoor wireless system for personalized shopping assistance", CiteSeerX, in Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Manuel L Barbee
*Assistant Examiner* — Raymond L Nimox
(74) *Attorney, Agent, or Firm* — Lindauer Law, PLLC

(57) ABSTRACT

Shelves or other fixtures may be used to support items at a facility. Load cells at the fixtures may be used to acquire weight data indicative of changes to the fixture as items are added or removed from the fixture. Vibration of the fixtures may introduce noise into the weight data, resulting in inaccurate weight data. Described are techniques for utilizing a vibration sensor on the fixture to determine the presence of vibration. In one implementation, weight data obtained during vibration may be disregarded. In another implementation, data from the vibration sensor may be used to adaptively adjust values of the weight data. By utilizing the information from the vibration sensor, more accurate weight data is obtained. The weight data may then be used to determine a count of items at the fixture, determine a quantity of items picked or placed, and so forth.

21 Claims, 9 Drawing Sheets

(56) References Cited

U.S. PATENT DOCUMENTS

| | | | | |
|---|---|---|---|---|
| 2004/0002927 A1* | 1/2004 | Eaton | ............ | G01G 19/005 705/414 |
| 2007/0111753 A1* | 5/2007 | Vock | ............ | A43B 3/0005 455/552.1 |
| 2011/0011936 A1 | 1/2011 | Morandi et al. | | |
| 2012/0245969 A1* | 9/2012 | Campbell | ............ | G06Q 10/087 705/7.11 |
| 2012/0270605 A1* | 10/2012 | Garrone | ............ | H04M 1/72563 455/566 |
| 2012/0284132 A1 | 11/2012 | Kim et al. | | |
| 2013/0284806 A1 | 10/2013 | Margalit | | |
| 2014/0114708 A1* | 4/2014 | Campbell | ............ | G08B 5/22 705/7.11 |
| 2015/0075879 A1 | 3/2015 | Sakai et al. | | |
| 2015/0086107 A1 | 3/2015 | Dedeoglu et al. | | |
| 2015/0310601 A1* | 10/2015 | Rodriguez | ............ | G06T 1/0007 348/150 |
| 2016/0041068 A1* | 2/2016 | Wascat | ............ | G01M 99/005 702/39 |
| 2016/0132822 A1* | 5/2016 | Swafford | ............ | H04W 4/80 705/28 |
| 2016/0134930 A1* | 5/2016 | Swafford | ............ | A47F 5/0068 725/80 |
| 2016/0183687 A1* | 6/2016 | Hoyt | ............ | A47C 31/126 297/217.2 |
| 2018/0061207 A1* | 3/2018 | Nygren | ............ | G01N 29/14 |

OTHER PUBLICATIONS

Kalnikaite, et al., "How to Nudge in Situ: Designing Lambent Devices to Deliver Information Salience in Supermarkets", ACM, in proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

"Vibration Measuring Instruments", Quick Guide to Precision Measuring Instruments. Mitutoyo. pp. 46-47. Retrieved from Internet: <<URL: http://www.mitutoyo.co.jp/eng/products/menu/QuickGuide_Vibration-Testing-Machines.pdf>.

Pop, Cristian, "Introduction to the BodyCom Technology", AN1391, DS01391A, Microchip Technology, Inc., May 2, 2011.

Vu, et al., "Distinguishing Users with Capacitive Touch Communication", Winlab, Rutgers University, in proceedings of: The 18th Annual International Conference on Mobile Computing and Networking ("MobiCom'12"), Aug. 22-26, 2012, Istanbul, Turkey.

* cited by examiner

SYSTEM TO MITIGATE EFFECTS OF VIBRATION ON LOAD CELL

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other distribution pathways (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor quantity of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
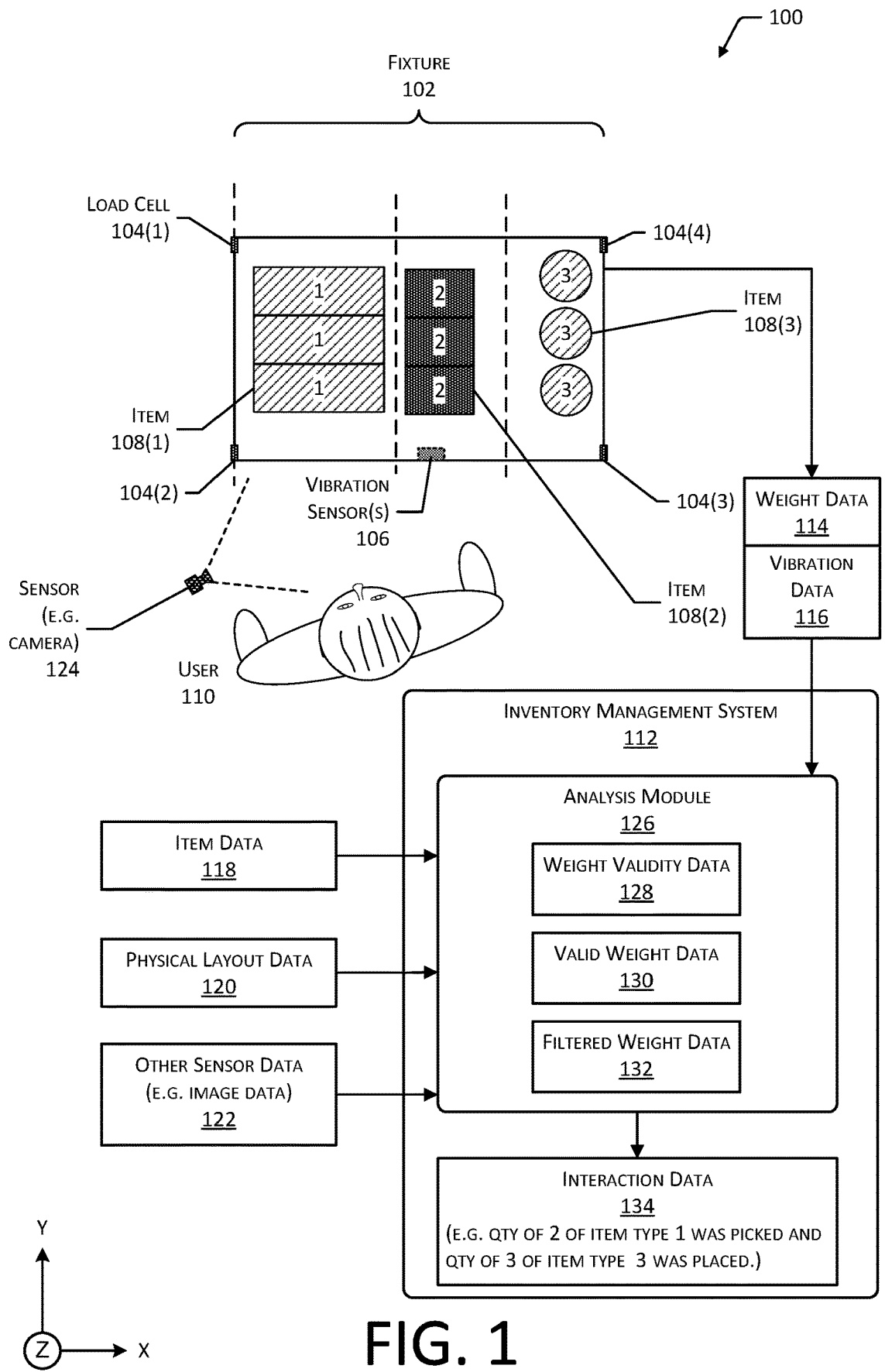
FIG. 1 illustrates a system that uses a fixture with load cells to determine interaction data about the pick (removal) or place (return or loading) of items stowed on a fixture and uses vibration sensors to determine validity of the weight data, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A materials handling facility (facility) or other setting may utilize fixtures, such as shelves, that are equipped with load cells or other weight sensing devices. Weight data generated by these load cells may be used to determine interactions with items stowed or otherwise held by those fixtures. The facility may include, or have access to, an inventory management system. The inventory management system may be configured to maintain information about items, users, condition of the facility, and so forth. For example, the inventory management system may maintain data indicative of a number of items at a particular fixture, what items a particular user is ordered to pick, how many items have been picked or placed at the fixture, requests for assistance, environmental status of the facility, and so forth.

Operation of the facility may be facilitated by using data from sensors, such as the load cells, to determine interactions in the facility. Interactions may comprise the user picking an item from a fixture, placing an item at a fixture, touching an item, bringing an object such as a hand or face close to an item, and so forth. For example, the inventory management system may generate interaction data that indicates what item a user picked from a particular fixture, and then use this interaction data to adjust the count of inventory stowed at the particular fixture.

The load cells may be arranged to gather information about the changes in weight occurring at a fixture. For example, the fixture may comprise a rectangular shelf with load cells arranged at or near each end of the shelf, at or near each of the four corners, or in other configurations.

The weight data may be used to determine data such as a quantity of items that have been picked from or placed to a fixture, to determine the identity of a type of item that has been picked from or placed to the fixture, and so forth. Use of load cells and the weight data offers several operational benefits, especially in a materials handling facility or other facility. These benefits may include mechanical robustness, relatively low cost for installation and maintenance, fast response times, and so forth.

However, the load cells may be affected by vibration, resulting in erroneous output that indicates weight changes due to vibration rather than an actual change in the load of items at the fixture. If the erroneous data is provided to the inventory management system, the inventory management system may make incorrect determinations. For example, a large truck passing by the facility may generate vibrations that produce erroneous output. The erroneous output may be indicative of a temporary decrease in weight at the fixture. If used by the inventory management system, this erroneous data could result in interaction data being incorrectly generated that a user picked an item from the shelf when they have not.

Described in this disclosure are fixtures that include weight sensors and vibration sensors. The vibration sensors produce vibration data that is indicative of vibration of the fixture, or a portion thereof. In one implementation, the fixture may comprise shelves supported by a gondola or other support structure. Weight sensors provide weight data indicative of the weight of a load on the shelves. A vibration sensor may be positioned at a front edge of the shelf and produce vibration data. In one implementation, the vibration sensor may comprise one or more gyroscopes. Different numbers and placements of vibration sensors are possible. For example, each shelf may have a vibration sensor. In another example, the vibration sensor may be affixed to the support structure of the fixture.

The weight data and the vibration data may be synchronized in time with respect to one another. When the vibration data indicates vibration values that are less than or equal to the threshold value, the weight data may be used for processing by the inventory management system. For example, the vibration data for the period of time during which the vibration values are less than or equal to the threshold value may be deemed valid weight data. This valid weight data may then be used by the inventory management system to determine the interaction data. For example, the valid weight data may be used to determine that five cans of pet food were removed from a particular shelf.

Vibrations above a threshold value may result in incorrect weight readings of the load cell. When the vibration data indicates vibration values that exceed a threshold value, the weight data for the corresponding time may be disregarded or deemed invalid. This prevents erroneous weight data from being used and subsequently producing erroneous interaction data. In some implementations, a settling interval may be incorporated. For example, after a vibration event, it may be determined that the load cell output will stabilize within 100 milliseconds. As a result, the weight data obtained for the time when the vibration values exceeded the threshold value and for 100 milliseconds after the vibration values dropped below the threshold value may be deemed invalid weight data.

The threshold value may be fixed or dynamic. For example, a dynamically adjustable threshold value may change based on the total weight of the fixture, the vibration value, vibration duration, and so forth. Continuing the example, when the fixture is heavily laden, the threshold value may be lower than when the fixture is lightly loaded.

In one implementation, the vibration data may be used to control filtering of the weight data. For example, when the vibration data indicates vibration values that exceed a threshold value, one or more filters may be applied to the weight data to produce filtered weight data. The inventory management system may use the filtered weight data to generate interaction data.

By using the devices and techniques described herein, operation of the facility may be improved. Noise in the weight data that results from vibrations may be minimized, improving the quality of the weight data subsequently used by the inventory management system. The improved quality of weight data may enable the inventory management system to produce more accurate interaction data. As a result, the inventory management system may be able to quickly track what item a user has interacted with, maintain up-to-date item data, and so forth.

Illustrative System

FIG. 1 illustrates a system 100 that uses a fixture 102 with load cells 104 and vibration sensors 106 to determine interaction data about a fixture 102, such as a shelf, according to some implementations. A fixture 102, such as a shelf, is equipped with a plurality of load cells 104. Each load cell 104 is configured to generate information indicative of a weight applied thereto. For example, the load cell 104 may comprise a weight sensor that supports at least a portion of the fixture 102. The load cells 104 are described in more detail below. As depicted here, the fixture 102 is measured using four load cells 104(1), 104(2), 104(3), and 104(4). Each load cell 104 is located at the four corners of the rectangular fixture 102. For example, the load cell 104(1) is located at a rear left corner, the load cell 104(2) is located at a front left corner, the load cell 104(3) is located at a front right corner, and the load cell 104(4) is located at a rear right corner. In other implementations, other arrangements of load cells 104 may be utilized. The techniques described herein may be used with regard to other types of fixtures 102 and devices that may stow items, such as racks, hangers, bins, and so forth.

The fixture 102 may include one or more vibration sensors 106. The vibration sensors 106 provide information about the physical motion of at least a portion of the fixture 102. For example, the vibration sensors 106 may comprise one or more gyroscopes. The gyroscopes may utilize microelectromechanical elements, fiber optical elements, lasers, and so forth, to determine rotation about one or more axes. The vibration sensors 106 are described in more detail below.

The fixture 102 may be divided into one or more partitioned areas. The partitioned areas are an area upon the fixture 102 that is associated with a particular type of item 108. For example, the fixture 102 depicted here has three partitioned areas. A first partitioned area may be associated with storing some quantity of item 108(1) such as cat food, while a second partitioned area may be associated with storing some quantity of item 108(2) such as dog food, and a third partitioned area may be associated with storing some quantity of item 108(3) such as fish food.

A user 110 may interact with the fixture 102 or the partitioned areas at the fixture 102. For example, the user 110 may remove item 108(1) from the partitioned area. The user 110 may then return the item 108(1) to the fixture 102. Several users 110 may interact with the same fixture 102 at the same time or in succession.

An inventory management system 112 may be configured, as described below, to perform various functions with regard to a facility. To perform these functions, the inventory management system 112 may accept weight data 114 indicative of the weight as produced by the load cells 104 and vibration data 116 as produced by the vibration sensors 106. For example, the load cells 104 may send weight signals to a computing device of the fixture 102 that then generates the weight data 114, which includes weight values and timestamps indicative of when those weight values were obtained. Continuing the example, the vibration sensors 106 may send vibration signals to a computing device for the fixture 102 that then generates the vibration data 116. The vibration data 116 may include vibration values such as rotational rates, rotational amplitudes, acceleration data, velocity data, displacement data, and so forth, and may also include timestamps indicative of when those vibration values were obtained. In some implementations, the computing device of the fixture 102 may provide various functions, such as filtering or otherwise conditioning signals, generating and transmitting the data to another device, and so forth.

The inventory management system 112 may maintain and utilize item data 118 and physical layout data 120. The item data 118 comprises information about a particular type of item 108. The item data 118 may include information indicative of a weight of a single item 108, or a package, kit, or another grouping considered to be a single item 108. The item data 118 may include other characteristics of that type of item 108 such as: physical dimensions, characteristics about how the item 108 appears, and so forth. For example, the item data 118 may comprise a plurality of local descriptor values generated by feature extraction algorithms, parameters for classifiers, neural network configuration data, and so forth, that characterizes the appearance of a representative one or more of the items 108. The item data 118 may indicate the types and quantities of items 108 that are expected to be stored at that particular fixture 102 such as in a particular lane on a fixture 102. The item data 118 may include other data. For example, the other data may comprise weight distribution of the item 108, point cloud data for the item 108, and so forth.

The physical layout data 120 may provide information indicative of where fixtures 102 are in the facility, location of sensors, information about sensor orientation and field of view (where applicable), and so forth. For example, the physical layout data 120 may comprise information representative of a map or floor plan of the facility with relative positions of fixtures 102, planogram data indicative of how types of items 108 are to be arranged at the fixtures 102, and so forth. In another example, the physical layout data 120 may comprise information indicating the particular placement of load cells 104 and vibration sensors 106 on a particular fixture 102. The physical layout data 120 may include information about the construction and arrangement of the fixtures 102 in the facility. For example, the physical layout data 120 may indicate that fixture 102(7) is a steel gondola-type unit supporting six shelves, each shelf being 48 inches wide and having a shelf depth of 22 inches.

The inventory management system 112 may utilize other sensor data 122 from other sensors 124. For example, the facility may include other sensors 124, such as cameras having a field of view that includes at least a portion of the fixture 102 or another fixture. The sensors 124 generate other sensor data 122, such as image data from the camera.

The inventory management system 112 may include or have access to an analysis module 126. During operation, the analysis module 126 may access one or more of the weight data 114, the vibration data 116, the item data 118, the physical layout data 120, or the other sensor data 122 to determine other information. This other information may include one or more of weight validity data 128 that is indicative of whether weight data 114 is valid, valid weight data 130 that comprises those weight values deemed valid, or filtered weight data 132 that comprises those weight values that have been filtered or otherwise processed.

The analysis module 126 may use one or more of the weight validity data 128, valid weight data 130, or filtered weight data 132 to generate interaction data 134. The interaction data 134 provides information about an interaction, such as a pick of an item 108 from the fixture 102, a place of an item 108 to the fixture 102, a touch made to an item 108 at the fixture 102, a gesture associated with an item 108 at the fixture 102, and so forth. The interaction data 134 may include one or more of the type of interaction, interaction location identifier indicative of the fixture 102 at which the interaction took place, an item identifier indicative of a type of item 108 or a particular item 108, quantity change to the item 108, user identifier, and so forth. The interaction data 134 may then be used to further update the item data 118. For example, the quantity of items 108 on hand at a particular partitioned area on the fixture 102 may be changed based on an interaction that picks or places one or more items 108. Operation of the analysis module 126, including generation of the interaction data 134, is discussed in more detail below.

In order to provide accurate interaction data 134, the analysis module 126 determines or filters with weight data 114 to mitigate the effects of noise in the weight data 114 that results from mechanical vibration. In a first implementation, weight data 114 that is designated as invalid may be disregarded or otherwise not used to determine interaction data 134. In a second implementation, weight data 114 that is designated as invalid may be filtered or otherwise processed to produce the filtered weight data 132. The filtered weight data 132 may then be used, at least in part, to determine the interaction data 134.

The analysis module 126 may generate weight validity data 128 for at least a portion of weight data 114. For example, the weight validity data 128 may be determined by determining if vibration values in the vibration data 116 exceed a threshold value. If so, the weight validity data 128 may indicate invalid weight data. For example, the weight validity data 128 may comprise a single bit binary value, with a "0" being representative of invalid weight values and a "1" being representative of valid weight values. In some implementations, the weight validity data 128 may be provided for individual ones of weight values, or for groupings of weight values. For example, a frame of weight data 114 that includes many individual weight values may be deemed to be valid or invalid. In another example, the weight values for a particular interval of time may be deemed to be valid or invalid.

The analysis module 126, or other modules, may perform event detection to determine if an event has taken place at the fixture 102. Events may include a pick or place of an item 108. One or more change detection algorithms may be used to identify when the weight values have changed in such a way as to meet or exceed a threshold value. For example, the event may be determined using a cumulative sum (CUSUM) function. An event may include valid weight data 130 or filtered weight data 132 that begins at a start time and continues through an end time.

By using these techniques, the inventory management system 112 is able to produce more accurate interaction data 134. Also, because the effects of vibration are mitigated in the data, fewer resources are needed to determine the interaction data 134. For example, by eliminating or reducing the noise in the weight values used by the analysis module 126, fewer instances of interaction data 134 with low confidence values occur. These low confidence instances may otherwise call for processing using a manual human operator, more computationally intensive computing techniques, and so forth.

Figure 2:
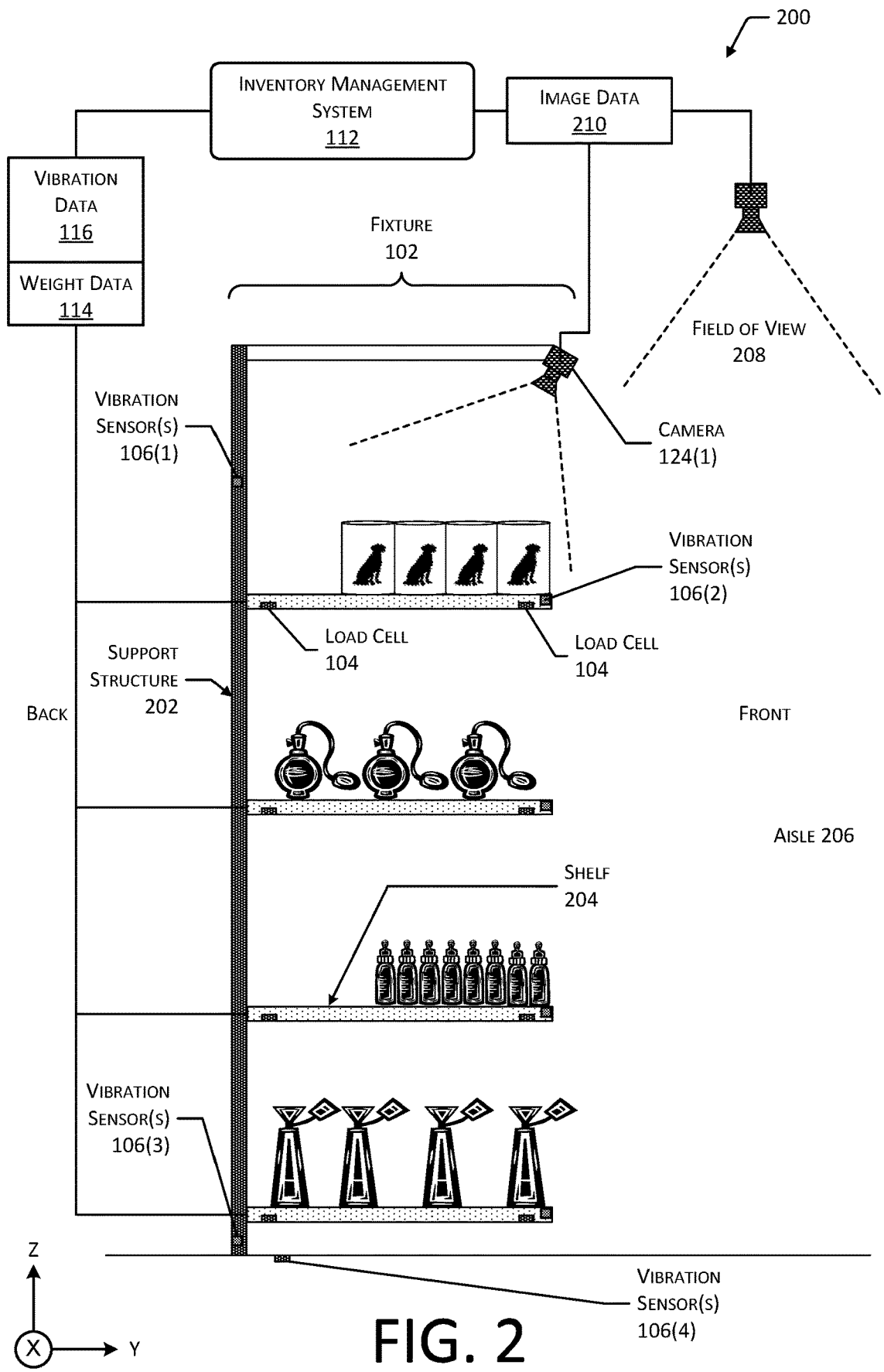
FIG. 2 is a side view of the fixture depicting placement of vibration sensors, according to some implementations.

FIG. 2 is a side view 200 of the fixture 102 depicting placement of vibration sensors 106, according to some implementations. In this illustration, the fixture 102 comprises a support structure 202 to which are mounted four shelves 204. Each shelf 204 includes load cells 104 that are used to generate weight data 114 indicative of the load on the shelf 204. For example, the weight data 114 may be indicative of the weight of pet food cans resting thereon. The support structure 202 may comprise a substantially vertical member, such as a steel upright that includes mechanical fastener elements, such as slots, designed to mechanically couple to corresponding mechanical fastener elements, such as tabs, on the shelf 204.

The shelf 204 has a back that is proximate to the support structure 202 in this fixture 102 and a front that is proximate to an aisle 206 or other location at which the user 110 would typically be during normal use. One or more vibration sensors 106 may be affixed to, incorporated within, or otherwise associated with the fixture 102. In the implementation depicted, one or more vibration sensors 106 are positioned proximate to the front of each shelf 204. The front of the shelf 204 is distal to the support structure 202. In other implementations, the vibration sensors 106 may be located in other positions, such as at a midpoint or back of the shelf 204.

One or more vibration sensors 106 may be located within the support structure 202. For example, vibration sensors 106(1) are located proximate to a top of the support structure 202, while vibration sensors 106(3) are located proximate to a base of the support structure 202.

One or more vibration sensors 106 may be arranged at other locations within the facility. For example, vibration sensors 106(4) may be affixed to or at least partially within the floor of the facility.

The vibration sensors 106 may include one or more gyroscopes, accelerometers, piezoelectric elements, optical vibrometers, mechanical vibrometers, or other devices that produce an output indicative of a mechanical displacement of an object or portion thereof. Mechanical vibrations result in displacement of at least a portion of the fixture 102. For example, the support structure 202 may sway slightly, the shelves 204 may move slightly up and down and side to side. In one implementation, the vibration sensors 106 may comprise an integrated microelectromechanical system (MEMS) gyroscope that detects rotation about one or more axes. In other implementations, the gyroscope may comprise one or more fiber optical elements, lasers, spinning masses, and so forth. The output from the gyroscope may be used as vibration data 116.

The vibration sensor 106 may comprise an inertial measurement unit that includes a multi-axis gyroscope and a multi-axis accelerometer. The vibration sensor 106 may comprise a piezoelectric film sensor. For example, TE Connectivity Ltd. of Schaffhausen, Switzerland provides a variety of different vibration sensors, including piezoelectric film sensors through their Measurement Specialties group. In yet another example, the vibration sensor 106 may comprise an optical vibrometer that utilizes a laser or other coherent light source to detect movement of a target object. For example, Polytech, GmBH of Waldbronn, Germany provides a lineup of optical vibrometers. In comparison, a mechanical vibrometer may utilize a suspended mass for which displacement relative to a frame is measured. Other types of vibration sensors 106 that may be used include, but are not limited to, electrokinetic velocity devices, servo acceleration devices, non-contact displacement devices, electrodynamic devices, and so forth. Other sensors may be used to generate data suitable for use as vibration data 116. For example, a load cell 104 supporting a known mass may be used as a vibration sensor 106.

The weight data 114 and the vibration data 116 may be sent to the inventory management system 112. For example, the weight data 114 and the vibration data 116 may be transmitted using a network to a server that is participating in performing the functions of the inventory management system 112.

As described above, the facility may include one or more other sensors 124, such as a camera 124(1). The camera 124(1) may have a field of view 208 that includes at least a portion of the fixture 102. For example, the camera 124(1) may be mounted to look down on a shelf 204. The camera 124(1) may produce image data 210 which may then be provided to the inventory management system 112. Image processing techniques may be used to process the image data 210 in order to generate the interaction data 134. As described above, the inventory management system 112 may receive or otherwise access weight data 114 and vibration data 116 to generate the interaction data 134.

The vibration data 116 and the weight data 114 may be multiplexed to reduce bandwidth usage, reduce number of data connections, and so forth. For example, by multiplexing the data, the data transmission overhead may be minimized. Data may be multiplexed using one or more of time division multiplexing, frequency division multiplexing, or other techniques. For example, frames of weight data 114 may be interlaced with frames of the vibration data 116. The multiplexing may be performed by a dedicated hardware device such as a multiplexor or by a computing device. For example, a computing device at the fixture 102 may acquire the weight data 114 and the vibration data 116, and produce multiplexed data. The multiplexed data may then be transmitted to another device, such as a server.

In some implementations, the fixture 102 or computing devices associated therewith may perform one or more functions of the analysis module 126. For example, a computing device connected to the weight sensors 104 and the vibration sensors 106 may determine the weight validity data 128 at the fixture 102. Subsequently, the computing device may then send valid weight data 130, filtered weight data 132, or both, to another device such as a server. By not sending invalid weight data, network bandwidth requirements for operation are reduced, and the processing load involved in the determination of validity is offloaded from a server to the computing device at the fixture 102.

Figure 3:
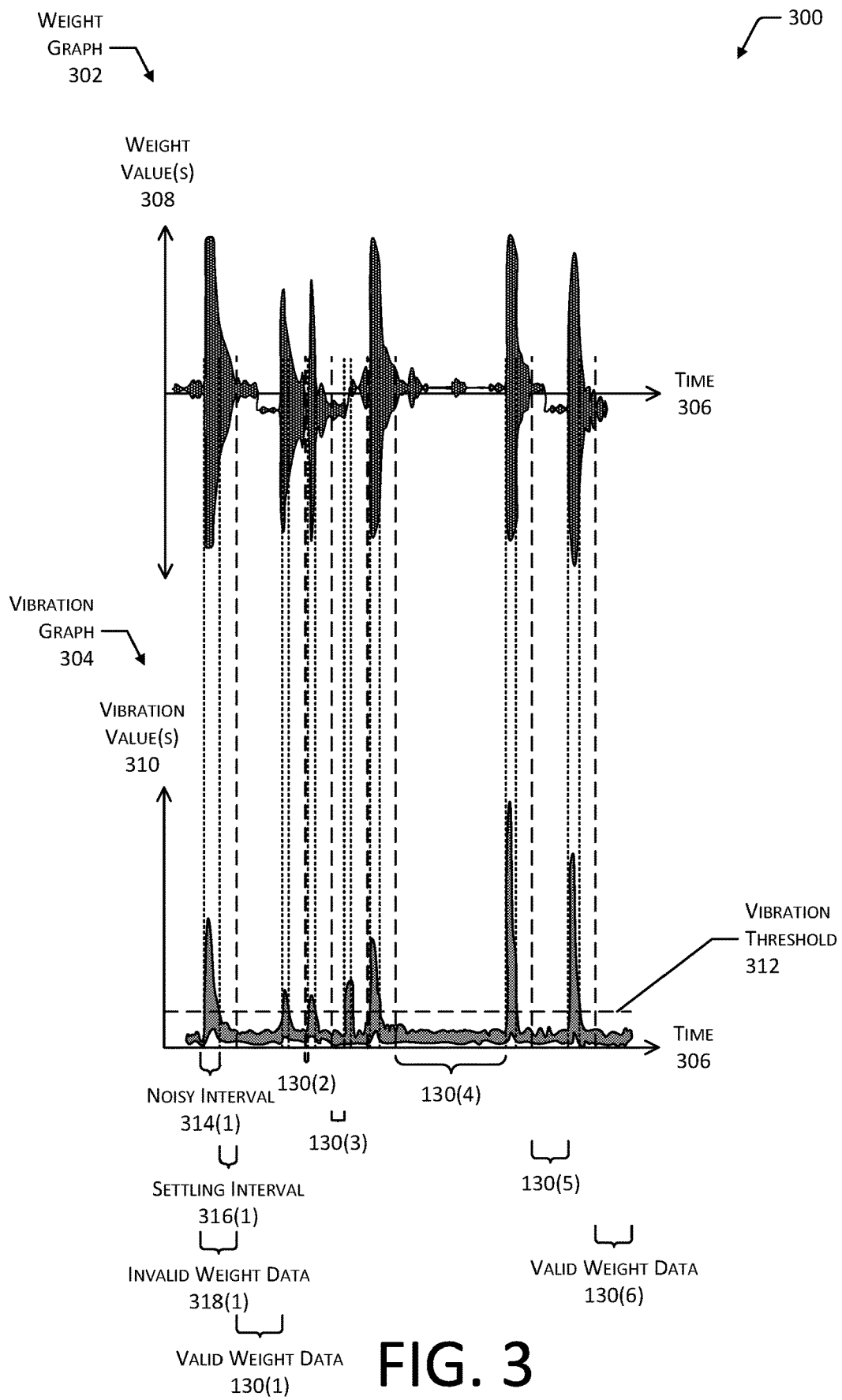
FIG. 3 depicts graphs of weight and vibration values over time that are used to determine validity of the weight data, according to some implementations.

FIG. 3 depicts graphs 300 of weight and vibration values over time that are used to determine validity of the weight data 114, according to some implementations. Shown are a weight graph 302 and a vibration graph 304. The weight graph 302 depicts increasing time 306 along a horizontal axis while weight values 308 are depicted along a vertical axis. The weight values 308 are indicative of a weight measured by the load cell 104 at a particular moment in time. The vibration graph 304 depicts increasing time 306 along the horizontal axis and vibration values 310 along a vertical axis. The vibration values 310 are indicative of mechanical vibration or displacement of at least a portion of the fixture 102 at a particular moment in time. For example, the vibration values 310 may be indicative of a rotation rate obtained from a gyroscope at a particular point in time.

The weight graph 302 and the vibration graph 304 are synchronized in time in this illustration. A vibration threshold 312 is depicted in the vibration graph 304. The vibration threshold 312 is indicative of a particular threshold value. Vibration values 310 may be compared to this threshold to determine if they exceed this threshold value. The threshold value may be static or dynamic. For example, the threshold value may be predefined. Continuing the example, the predefined threshold value may be determined during experimentation or from use that specifies when a vibration is so great it is deemed to be disruptive to the weight values 308 obtained at the same or similar times.

In this illustration, a first noisy interval 314(1) is specified. The first noisy interval 314(1) is described as the interval of time during which the vibration values 310 exceed the vibration threshold 312. In some implementations, the weight values 308 obtained during the noisy interval 314 may be deemed invalid.

The motion associated with vibration may take some time to dampen down. For example, vibration from a passing train may set the shelf 204 oscillating up and down slightly, resulting in weight values 308 that change, with the changes dying down as the energy of the vibration is dissipated.

A settling interval 316 may be specified. The settling interval 316 provides some interval of time for the fixture 102 or a portion thereof to reach a more stable state that is better suited for accurate measurement of weight. The settling interval 316 may be static or dynamically adjusted. For example, the settling interval 316 may be varied with respect to the total weight previously measured on the shelf 204. Continuing the example, if the shelf 204 is heavily laden, the settling interval 316 may be longer than when the shelf 204 is lightly loaded.

As illustrated here, an interval of invalid weight data 318(1) may be specified that includes the noisy interval 314(1) and the settling interval 316(1). Continuing the earlier example, if the noisy interval 314(1) was from time t=0 to t=250 milliseconds (ms) and the settling interval 316(1) is specified as 100 ms, the invalid weight data 318(1) may include weight values 308 obtained from t=0 to t=350 ms.

In another implementation, the determination of the validity of the weight data 114 for a particular time may be made as described above. The weight data 114 occurring at that time and for a particular duration of time thereafter may be designated as invalid weight data 318.

Once past the settling interval 316, and free from another noisy interval 314, a period of valid weight data 130(1) is shown. This valid weight data 130(1) may then be processed by the inventory management system 112 to determine the interaction data 134. Meanwhile, the invalid weight data 318 may be disregarded from consideration or may be further processed to mitigate the effects of the noise caused by vibration.

Figure 4:
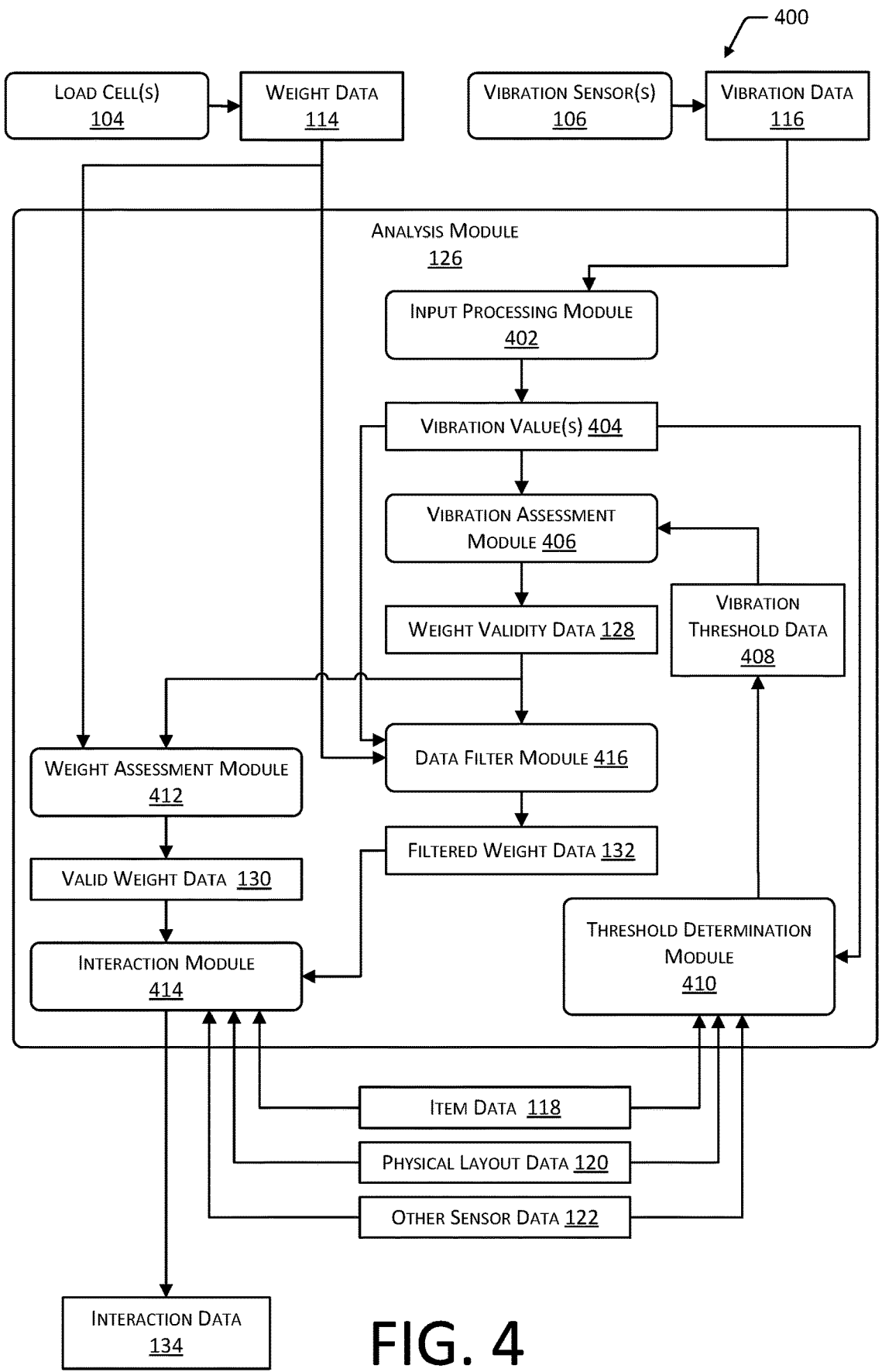
FIG. 4 is a block diagram of processing weight data and vibration data to determine interaction data, according to some implementations.

FIG. 4 is a block diagram 400 of processing weight data 114 and vibration data 116 to determine interaction data 134, according to some implementations.

The load cells 104 may generate weight signals indicative of a weight on the load cell 104. These weight signals are converted into the weight data 114. For example, analog output from the load cell 104 may be converted into digitized data using an analog to digital converter (ADC). In one implementation, the sample rate of the ADC may be 120 samples per second.

Vibration sensors 106 may produce vibration signals indicative of vibration at the vibration sensor 106. These vibration signals are converted into vibration data 116. For example, the analog output from the vibration sensor 106 may be converted into digitized data using an ADC.

The analysis module 126 may include an input processing module 402. The input processing module 402 may process the vibration data 116 to determine vibration values 404. In one implementation, the vibration data 116 may comprise a serialized data stream indicative of samples of motion, such as output that is indicative of the number of degrees per second change in rotation produced by a gyroscope. The input processing module 402 may determine an average from a number of samples, or other types of data preprocessing. The vibration values 404 comprise data indicative of the vibration detected by the vibration sensor 106.

The analysis module 126 may include a vibration assessment module 406. The vibration assessment module 406 may utilize as input the vibration values 404. In one implementation, the vibration assessment module 406 may determine if changes in the vibration values 404 over a period of time exceed a threshold. The vibration assessment module 406 may accept vibration threshold data 408. The vibration threshold data 408 may specify a threshold value above which a vibration is deemed to be significant enough to adversely impact the weight data 114 as obtained by the load cells 104. For example, the vibration threshold 312 depicted in FIG. 3 may be the vibration threshold data 408.

The vibration threshold data 408 may be specified manually, such as by an installation technician. In other implementations, the vibration threshold data 408 may be dynamically determined. A threshold determination module 410 may be used to determine the vibration threshold data 408. The threshold determination module 410 may use a variety of information to determine the vibration threshold data 408. In one implementation, vibration values 404 may be provided to the threshold determination module 410. If the magnitude of the vibration values 404 exceeds a threshold value for a specified amount of time, the vibration threshold specified by the vibration threshold data 408 may be increased.

In other implementations, one or more of the item data 118, physical layout data 120, or other sensor data 122 may be used to specify the vibration threshold 312. For example, the vibration threshold data 408 may be determined on the weight of items 108 on the shelf 204. Continuing the example, as the weight on the shelf 204 increases, the vibration threshold 312 may decrease. For example, a total weight may be determined using weight data 114 obtained from load cells 104 at an earlier time. The threshold value specified by the vibration threshold data 408 may be determined based on this total weight. For example, the determination may involve a look up using a lookup table, or using a calculation in which the total weight is one of the inputs.

In another example, the type of fixture 102, the configuration of the fixture 102 such as the arrangement of shelves 204, placement of the vibration sensor 106, or other factors associated with the construction of the fixture 102 may be used to determine the vibration threshold data 408. Continuing the example, the threshold value specified by the vibration threshold data 408 may differ from when the vibration sensor 106 is located at the front of the shelf 204 as compared to if the vibration sensor 106 is located at the base of the support structure 202. In another example of how construction of the fixture 102 may be used to determine the vibration threshold, a particular fixture 102 that exhibits more motion responsive to vibration may have a greater vibration threshold than a more rigid fixture 102.

Returning to the vibration assessment module 406, in one implementation, weight validity data 128 may be generated based on the comparison of the vibration values 404 and a threshold value specified by the vibration threshold data 408. For example, if the weight values 404 exceed a threshold value specified by the vibration threshold data 408, weight validity data 128 may be generated indicative of invalid weight data. In another example, if the weight values 404 are less than or equal to the threshold value, the weight validity data 128 may indicate that the weight data 114 corresponding to the vibration data 116 may be deemed to be valid.

As described above, the weight validity data 128 provides information indicative of whether the weight data 114 is deemed to be valid or accurate or whether it is invalid due to the effects of vibration. In some implementations, other considerations may take place to determine overall validity of the weight data 114. For example, other techniques may be used to assess if a load cell 104 has failed and thus is producing erroneous data. Continuing this example, the validity of the weight data 114 may be determined based on an assessment of the health of the load cells 104 as well as on the vibration data 116.

The vibration assessment module 406 may utilize other techniques to determine the weight validity data 128. For example, a cumulative sum (CUSUM) function may be used to determine if there is a change in the vibration values 404 that is indicative of vibration that could adversely affect the weight data 114.

In one implementation, the weight validity data 128 may be provided to a weight assessment module 412 that may be in the analysis module 126. The weight assessment module 412 accepts as input weight data 114 that was obtained contemporaneously with the vibration data 116. In some implementations, the vibration data 116 and the weight data 114 may be synchronized, or they may be indicative of data acquired from the respective sensors within a given time of one another. For example, the weight data 114 obtained at t=175 ms may be assessed using weight validity data 128 that is based on vibration data 116 obtained at t=162 ms.

The weight assessment module 412 also accepts as input the weight validity data 128. If the weight validity data 128 indicates that the weight data 114 is valid, the weight assessment module 412 may produce valid weight data 130. In one implementation, the valid weight data 130 may comprise the weight data 114 that occurs at the time associated with the vibration data 116. The valid weight data 130 may then be provided to an interaction module 414. The interaction module 414 is discussed in more detail below.

In some implementations, instead of or in addition to the operation of the weight assessment module 412, a data filter module 416 may be utilized. The data filter module 416 may utilize analog, digital, or hybrid analog and digital techniques to filter the weight data 114.

Instead of disregarding the weight data 114 obtained during times of vibration that exceeds the vibration threshold data 408, in some implementations, it may be worthwhile to further process that otherwise erroneous weight data 114 using additional techniques. The data filter module 416 may accept as input the weight data 114 and the weight validity data 128. If the weight validity data 128 indicates that the weight data 114 is invalid based on the comparison to vibration threshold data 408, the data filter module 416 may apply one or more filters or other analytical techniques to generate the filtered weight data 132. For example, a high pass filter, low pass filter, point-by-point filter, notch filter, Butterworth filter, and so forth, may be used to generate the filtered weight data 132. In one implementation, a notch filter may be used that attenuates signals representative of a particular frequency range. The resulting filtered weight data 132 may express those signals but with the amplitude for those signals in the particular frequency range at a lower amplitude as compared to the weight data 114. For example, the notch filter may attenuate values of a portion of the weight data 114 that exhibit values representative of vibration within the frequency range of the notch filter. The filtered weight data 132 may then include values representative of those vibrations within the frequency range, albeit at a lesser amplitude when compared to the unfiltered weight data 114.

In some implementations, one or more filter parameters may vary based on other factors. For example, the settings for the high pass filter or low-pass filter may vary based on the vibration values 404. Continuing the example, as the amplitude of the vibrations decrease as indicated by decreasing vibration values 404, the extent of the filtering may decrease and eventually be set to zero as vibration values 404 decrease to a threshold value.

The analysis module 126 may also include the interaction module 414. The interaction module 414 may accept as input one or more of the valid weight data 130, or the filtered weight data 132. The interaction module 414 may also accept as input one or more of item data 118, physical layout data 120, other sensor data 122, and so forth. The interaction module 414 may use the one or more of the valid weight data 130 or the filtered weight data 132 to determine a change in weight at the fixture 102 from a first time to a second time, information about a change in the center of gravity of the fixture 102 or portion thereof from the first time to the second time, and so forth. Based on this information, using previously defined data such as item data 118 that indicates a particular type of item 108 is stowed at a particular partitioned area on the shelf 204, the weight of each of the type of item 108, and a change in weight using the valid weight data 130 or the filtered weight data 132, interaction data 134 may be determined. As described, the interaction data 134 may be indicative of a pick or place of a specific type of item 108 and the quantity thereof.

For example, a weight on the fixture 102 may be calculated using the weight data 114 designated as valid weight data 130. A representative weight of a type of item 108 associated with the fixture 102 may be determined. For example, the representative weight may be the weight per can of pet food. A quantity of the type of item 108 may be determined by using the weight data 114 designated as valid weight data 130 and the representative weight.

The interaction data 134 may then be subsequently used to provide for inventory management, billing a particular account, and so forth. For example, based on the interaction data 134 indicative of a pick of an item 108 from a particular shelf 204, an account associated with the user 110 may be billed, and the quantity on hand for that type of item 108 may be decreased accordingly.

Figure 5:
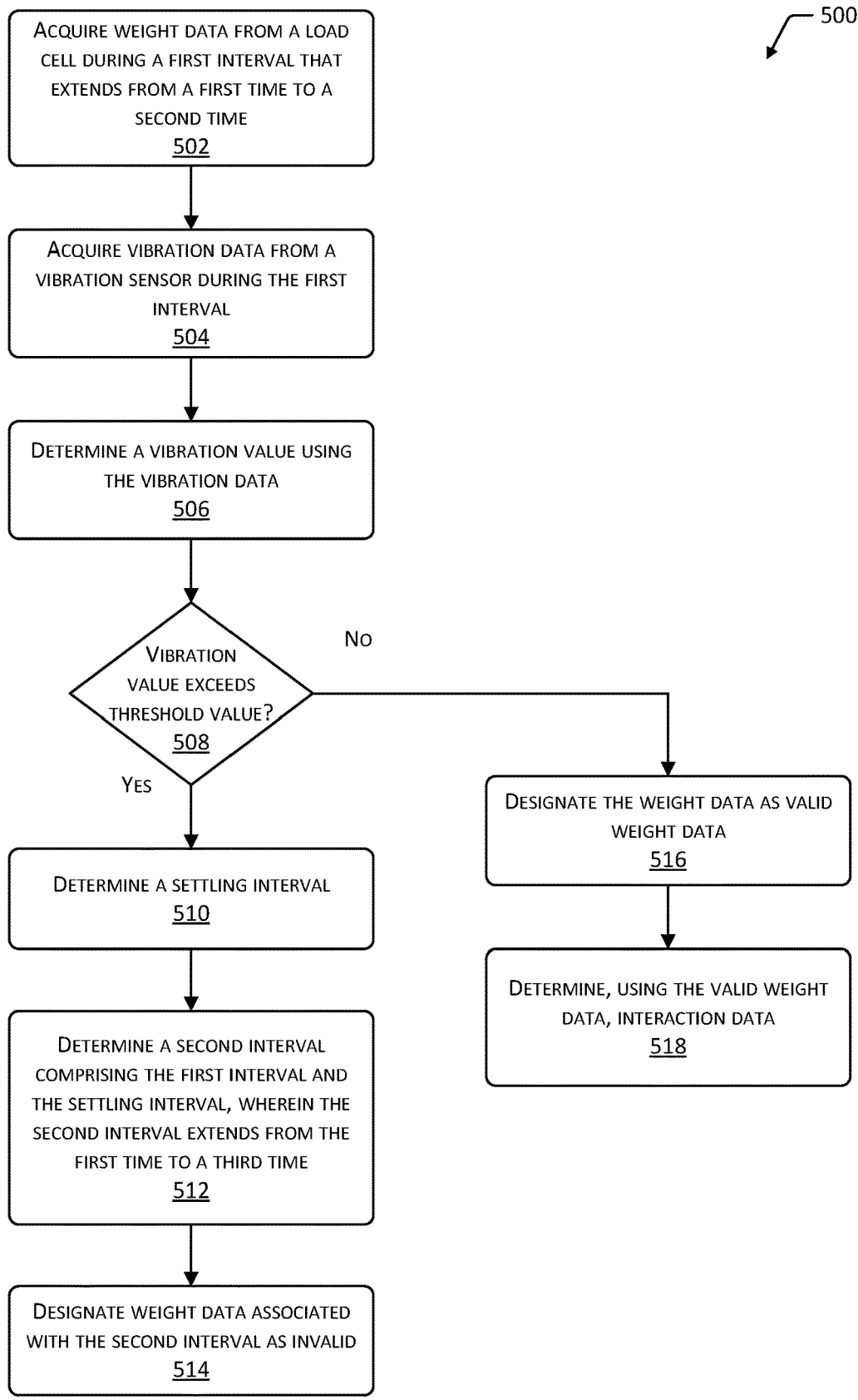
FIG. 5 is a flow diagram of a process to use vibration data to determine validity of weight data with valid weight data being used to determine interaction data, according to some implementations.

FIG. 5 is a flow diagram 500 of a process of using vibration data 116 to determine validity of weight data 114, with valid weight data 130 being used to determine interaction data 134, according to some implementations. The process may be implemented at least in part by one or more of a computing device or other electronics associated with the fixture 102, or an external computing device such as a server.

At 502, weight data 114 is acquired from a load cell 104 during the first interval that extends from a first time to a second time. In some implementations, the weight data 114 may be accessed. For example, the weight data 114 may be retrieved from a memory location, buffer, obtained from a serialized data stream, and so forth.

At 504, vibration data 116 is acquired from a vibration sensor 106. In some implementations, the vibration data 116 may be obtained at the same time or within a predetermined window of time as the first interval. In other implementations, the vibration data 116 may be obtained at a different time from the weight data 114. For example, the vibration data 116 may be obtained at a time that is before the first interval. In some implementations, the vibration data 116 may be accessed. For example, the vibration data 116 may be retrieved from a memory location, buffer, obtained from a serialized data stream, and so forth.

At 506, one or more vibration values 404 are determined using the vibration data 116. The vibration data 116 may comprise values indicative of one or more of rotation, velocity, acceleration, displacement, and so forth. These values may be further processed to produce the vibration values 404. For example, the vibration values 404 may comprise a root mean square of the plurality of one or more values indicative of rotation obtained from a vibration sensor 106. In another example, the vibration values 404 may comprise a moving average value calculated from a time series of vibration measurements.

At 508, the one or more vibration values 404 are compared to a threshold value such as indicated by the vibration threshold data 408. If the vibration value 404 exceeds the vibration threshold 312, the process may proceed to 510. At 510, a settling interval 316 is determined. For example, a settling interval 316 may be retrieved from storage. In some implementations, the settling interval 316 may comprise a fixed value, or may be dynamically adjustable. For example, if the vibration values 404 exceed a second threshold value, a longer settling interval 316 may be specified than if the vibration values 404 are less than the second threshold value.

At 512, a second interval is determined that comprises the first interval and the settling interval 316. The second interval extends from the first time to a third time. For example, if the first interval covers t=0 to t=250 ms, and the settling interval 316 is 75 ms, the second interval may be from t=0 to t=325 ms.

At 514, the weight data 114 associated with the second interval is designated as invalid. For example, the weight validity data 128 may specify that the weight data 114 occurring within the interval of invalid weight data 318 is invalid.

Returning to 508, if the vibration value 404 does not exceed the threshold value, the process may proceed to 516. At 516, the weight data 114 is designated as valid weight data 130.

At 518, interaction data 134 is determined using the valid weight data 130. For example, one or more of a pick or place of one or more of the items 108 stowed at the shelf 204 or other fixture 102 may be determined. By utilizing this process, potentially erroneous weight data 114 that may have been produced as a result of vibration may be removed from consideration by the interaction module 414. As a result, the accuracy of the interaction data 134 may be improved.

Figure 6:
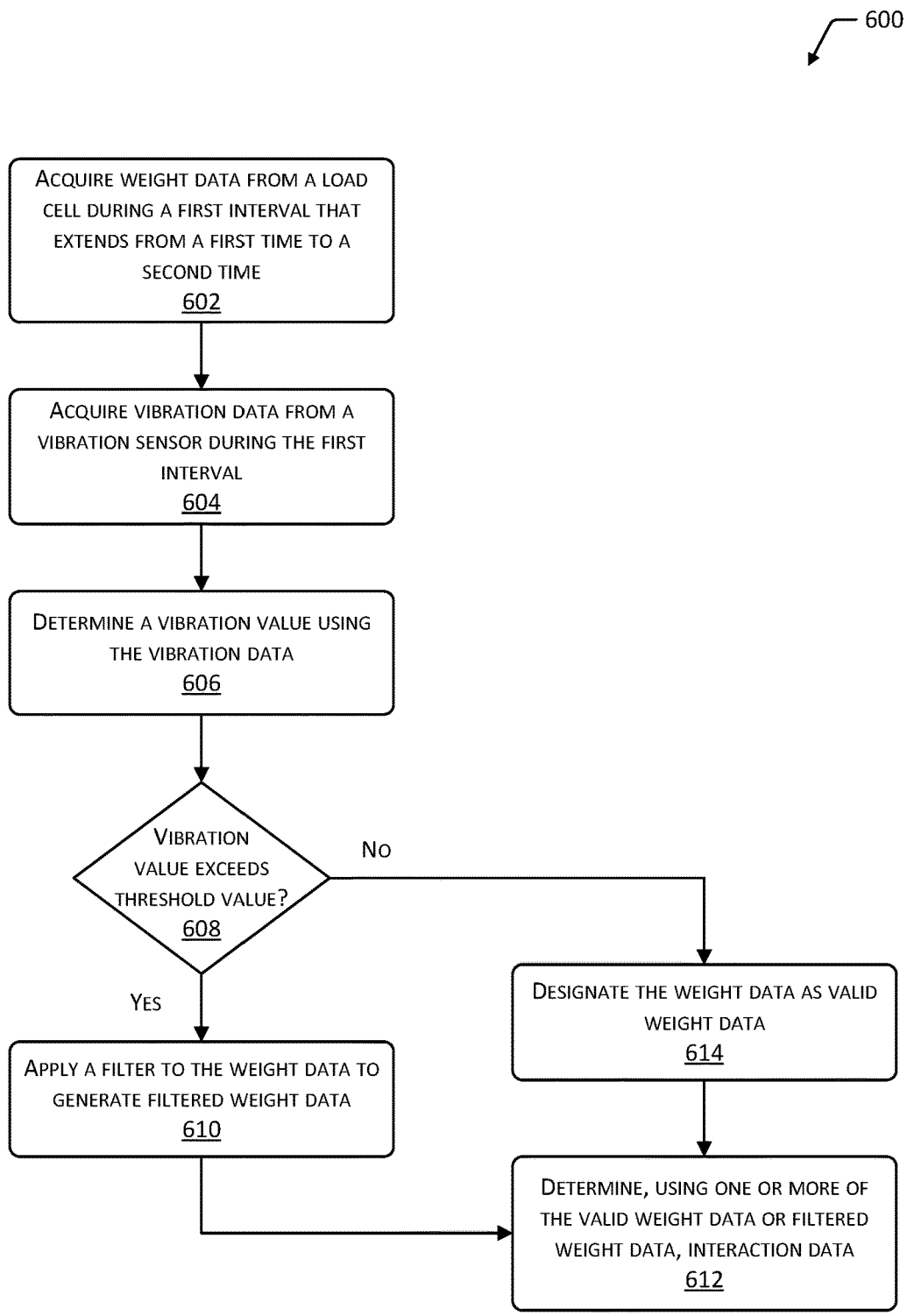
FIG. 6 is a flow diagram of a process to use vibration data to filter weight data that may then be used to determine interaction data, according to some implementations.

FIG. 6 is a flow diagram 600 of a process of using vibration data 116 to filter weight data 114 that may then be used to determine interaction data 134, according to some implementations. The process may be implemented at least in part by one or more of a computing device or other electronics associated with the fixture 102, or an external computing device such as a server.

At 602, weight data 114 is acquired from a load cell 104 during the first interval that extends from a first time to a second time. In some implementations, the weight data 114 may be accessed. For example, the weight data 114 may be retrieved from a memory location, buffer, obtained from a serialized data stream, and so forth.

At 604, vibration data 116 is acquired from a vibration sensor 106. In some implementations, the vibration data 116 may be obtained at the same time or within a predetermined window of time as the first interval. In other implementations, the vibration data 116 may be obtained at a different time from the weight data 114. For example, the vibration data 116 may be obtained at a time that is before the first interval. In some implementations, the vibration data 116 may be accessed. For example, the vibration data 116 may be retrieved from a memory location, buffer, obtained from a serialized data stream, and so forth.

At 606, one or more vibration values 404 are determined using the vibration data 116. For example, the vibration values 404 may comprise a root mean square of the plurality of one or more values indicative of rotation obtained from a vibration sensor 106 comprising a gyroscope. In another example, the vibration values 404 may comprise a moving average value calculated from a time series of vibration measurements.

At 608, the one or more vibration values 404 are compared to a threshold value such as indicated by the vibration threshold data 408. If the vibration value 404 exceeds the vibration threshold 312, the process may proceed to 610.

At 610, one or more filters or filter functions are applied to at least a portion of the weight data 114 to generate filtered weight data 132. For example, a high pass filter may be applied to the weight data 114. The process may then proceed to 612.

Returning to 608, if the vibration value 404 is less than or equal to the vibration threshold 312 as specified by the vibration threshold data 408, the process may proceed to 614. At 614, the weight data 114 is designated as valid weight data 130. The process may then proceed to 612.

At 612, interaction data 134 is determined using one or more of the valid weight data 130 or the filtered weight data 132. For example, a pick or place of one or more types of items 108 may be determined using the valid weight data 130 and the filtered weight data 132.

Figure 7:
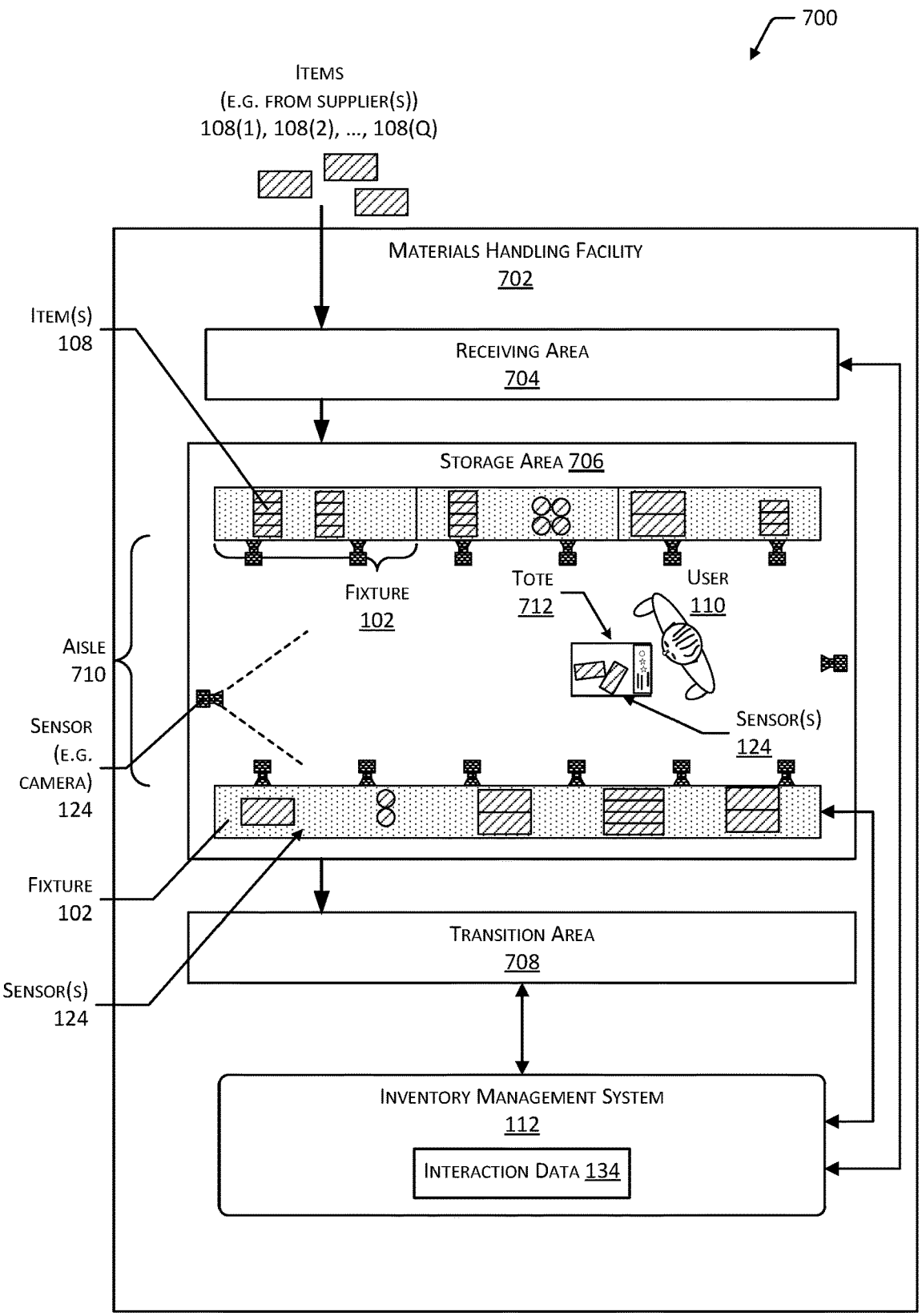
FIG. 7 is a block diagram illustrating a materials handling facility (facility) using the system, according to some implementations.

FIG. 7 is a block diagram 700 illustrating a materials handling facility (facility) 702 using the system 100, according to some implementations. A facility 702 comprises one or more physical structures or areas within which one or more items 108(1), 108(2), . . . , 108(Q) may be held. As used in this disclosure, letters in parenthesis such as "(Q)" indicate an integer value greater than or equal to zero. The items 108 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 108, such as from suppliers, for intake into the facility 702. For example, the receiving area 704 may include a loading dock at which trucks or other freight conveyances unload the items 108. In some implementations, the items 108 may be processed, such as at the receiving area 704, to generate at least a portion of the item data 118. For example, an item 108 may be imaged or otherwise scanned to develop reference images or representations of the item 108 at the receiving area 704.

The storage area 706 is configured to store the items 108. The storage area 706 may be arranged in various physical configurations. In one implementation, the storage area 706 may include one or more aisles 710. The aisle 710 may be configured with, or defined by, fixtures 102 on one or both sides of the aisle 710. The fixtures 102 may include one or more of a shelf 204, a rack, a case, a cabinet, a bin, a floor location, or other suitable storage mechanisms for holding, supporting, or storing the items 108. For example, the fixtures 102 may comprise shelves 204 with partitioned areas designated therein. The fixtures 102 may be affixed to the floor or another portion of the structure of the facility 702. The fixtures 102 may also be movable such that the arrangements of aisles 710 may be reconfigurable. In some implementations, the fixtures 102 may be configured to move independently of an outside operator. For example, the fixtures 102 may comprise a rack with a power source and a motor, operable by a computing device to allow the rack to move from one location within the facility 702 to another.

One or more users 110 and totes 712 or other material handling apparatus may move within the facility 702. For example, the user 110 may move about within the facility 702 to pick or place the items 108 in various fixtures 102, placing them on the tote 712 for ease of transport. The tote 712 is configured to carry or otherwise transport one or more items 108. For example, the tote 712 may include a basket, cart, bag, bin, and so forth. In other implementations, other material handling apparatuses such as robots, forklifts, cranes, aerial drones, and so forth, may move about the facility 702 picking, placing, or otherwise moving the items 108. For example, a robot may pick an item 108 from a first fixture 102(1) and move the item 108 to a second fixture 102(2).

One or more sensors 124 may be configured to acquire information in the facility 702. The sensors 124 may include, but are not limited to, cameras 124(1), depth sensors 124(2), load cells 104, optical sensor arrays 124(13), proximity sensors 124(6), and so forth. The sensors 124 may be stationary or mobile, relative to the facility 702. For example, the fixtures 102 may contain load cells 104 to generate weight signals, cameras 124(1) to acquire images of picking or placement of items 108 on shelves 204, optical sensor arrays 124(13) to detect shadows of the user's 110 hands at the fixtures 102, and so forth. In another example, the facility 702 may include a camera 124(1) to obtain images of the user 110 or other objects in the facility 702. The sensors 124 are discussed in more detail below with regard to FIG. 8.

While the storage area 706 is depicted as having one or more aisles 710, fixtures 102 storing the items 108, sensors 124, and so forth, it is understood that the receiving area 704, the transition area 708, or other areas of the facility 702 may be similarly equipped. Furthermore, the arrangement of the various areas within the facility 702 is depicted functionally rather than schematically. For example, in some implementations, multiple different receiving areas 704, storage areas 706, and transition areas 708 may be interspersed rather than segregated in the facility 702.

The facility 702 may include, or be coupled to, an inventory management system 112. The inventory management system 112 is configured to interact with users 110 or devices such as sensors 124, robots, material handling equipment, computing devices, and so forth, in one or more of the receiving area 704, the storage area 706, or the transition area 708.

During operation of the facility 702, the sensors 124 may be configured to provide sensor data, or information based on the sensor data, to the inventory management system 112. The sensor data may include image data 210, non-image data, weight data 114 obtained from load cells 104, and so forth. The sensors 124 are described in more detail below with regard to FIG. 8.

The inventory management system 112 or other systems may use the sensor data to track the location of objects within the facility 702, movement of the objects, or provide other functionality. Objects may include, but are not limited to, items 108, users 110, totes 712, and so forth. For example, a series of images acquired by the camera 124(1) may indicate removal by the user 110 of an item 108 from a particular location on the fixture 102 and placement of the item 108 on or at least partially within the tote 712.

The facility 702 may be configured to receive different kinds of items 108 from various suppliers and to store them until a customer orders or retrieves one or more of the items 108. A general flow of items 108 through the facility 702 is indicated by the arrows of FIG. 7. Specifically, as illustrated in this example, items 108 may be received from one or more suppliers, such as manufacturers, distributors, wholesalers, and so forth, at the receiving area 704. In various implementations, the items 108 may include merchandise, commodities, perishables, or any suitable type of item 108, depending on the nature of the enterprise that operates the facility 702.

Upon being received from a supplier at the receiving area 704, the items 108 may be prepared for storage in the storage area 706. For example, in some implementations, items 108 may be unpacked or otherwise rearranged. The inventory management system 112 may include one or more software applications executing on a computer system to provide inventory management functions. These inventory management functions may include maintaining information indicative of the type, quantity, condition, cost, location, weight, or any other suitable parameters with respect to the items 108. The items 108 may be stocked, managed, or dispensed in terms of countable units, individual units, or multiple units, such as packages, cartons, crates, pallets, or other suitable aggregations. Alternatively, some items 108, such as bulk products, commodities, and so forth, may be stored in continuous or arbitrarily divisible amounts that may not be inherently organized into countable units. Such items 108 may be managed in terms of a measurable quantity such as units of length, area, volume, weight, time, duration, or other dimensional properties characterized by units of measurement. Generally speaking, a quantity of an item 108 may refer to either a countable number of individual or aggregate units of an item 108 or a measurable amount of an item 108, as appropriate.

After arriving through the receiving area 704, items 108 may be stored within the storage area 706. In some implementations, like items 108 may be stored or displayed together in the fixtures 102 such as in bins, on shelves 204, hanging from pegboards, and so forth. In this implementation, all items 108 of a given kind are stored in one fixture 102. In other implementations, like items 108 may be stored in different fixtures 102. For example, to optimize retrieval of certain items 108 having frequent turnover within a large physical facility 702, those items 108 may be stored in several different fixtures 102 to reduce congestion that might occur at a single fixture 102.

When a customer order specifying one or more items 108 is received, or as a user 110 progresses through the facility 702, the corresponding items 108 may be selected or "picked" from the fixtures 102 containing those items 108. In various implementations, item picking may range from manual to completely automated picking. For example, in one implementation, a user 110 may have a list of items 108 they desire and may progress through the facility 702 picking items 108 from fixtures 102 within the storage area 706 and placing those items 108 into a tote 712. In other implementations, employees of the facility 702 may pick items 108 using written or electronic pick lists derived from customer orders. These picked items 108 may be placed into the tote 712 as the employee progresses through the facility 702.

After items 108 have been picked, the items 108 may be processed at a transition area 708. The transition area 708 may be any designated area within the facility 702 where items 108 are transitioned from one location to another or from one entity to another. For example, the transition area 708 may be a packing station within the facility 702. When the item 108 arrives at the transition area 708, the items 108 may be transitioned from the storage area 706 to the packing station. Information about the transition may be maintained by the inventory management system 112.

In another example, if the items 108 are departing the facility 702, a list of the items 108 may be obtained and used by the inventory management system 112 to transition responsibility for, or custody of, the items 108 from the facility 702 to another entity. For example, a carrier may accept the items 108 for transport with that carrier accepting responsibility for the items 108 indicated in the list. In another example, a user 110 may purchase or rent the items 108 and remove the items 108 from the facility 702. During use of the facility 702, the user 110 may move about the facility 702 to perform various tasks, such as picking or placing the items 108 in the fixtures 102.

To facilitate operation of the facility 702, the inventory management system 112 is configured to use the sensor data including the weight data 114 and other information such as the item data 118, the physical layout data 120, the non-weight data, and so forth, to generate interaction data 134.

The interaction data 134 may provide information about an interaction, such as a pick of an item 108 from the fixture 102, a place of an item 108 to the fixture 102, a touch made to an item 108 at the fixture 102, a gesture associated with an item 108 at the fixture 102, and so forth. The interaction data 134 may include one or more of the type of interaction, interaction location identifier indicative of where from the fixture 102 the interaction took place, item identifier, quantity change to the item 108, user identifier, and so forth. The interaction data 134 may then be used to further update the item data 118. For example, the quantity of items 108 on hand at a particular partitioned area on the fixture 102 may be changed based on an interaction that picks or places one or more items 108.

The inventory management system 112 may combine or otherwise utilize data from different sensors 124 of different types, including the load cells 104. For example, weight data 114 obtained from load cells 104 at the fixture 102 may be used in conjunction with non-weight data such as the image data to determine the interaction data 134.

Figure 8:
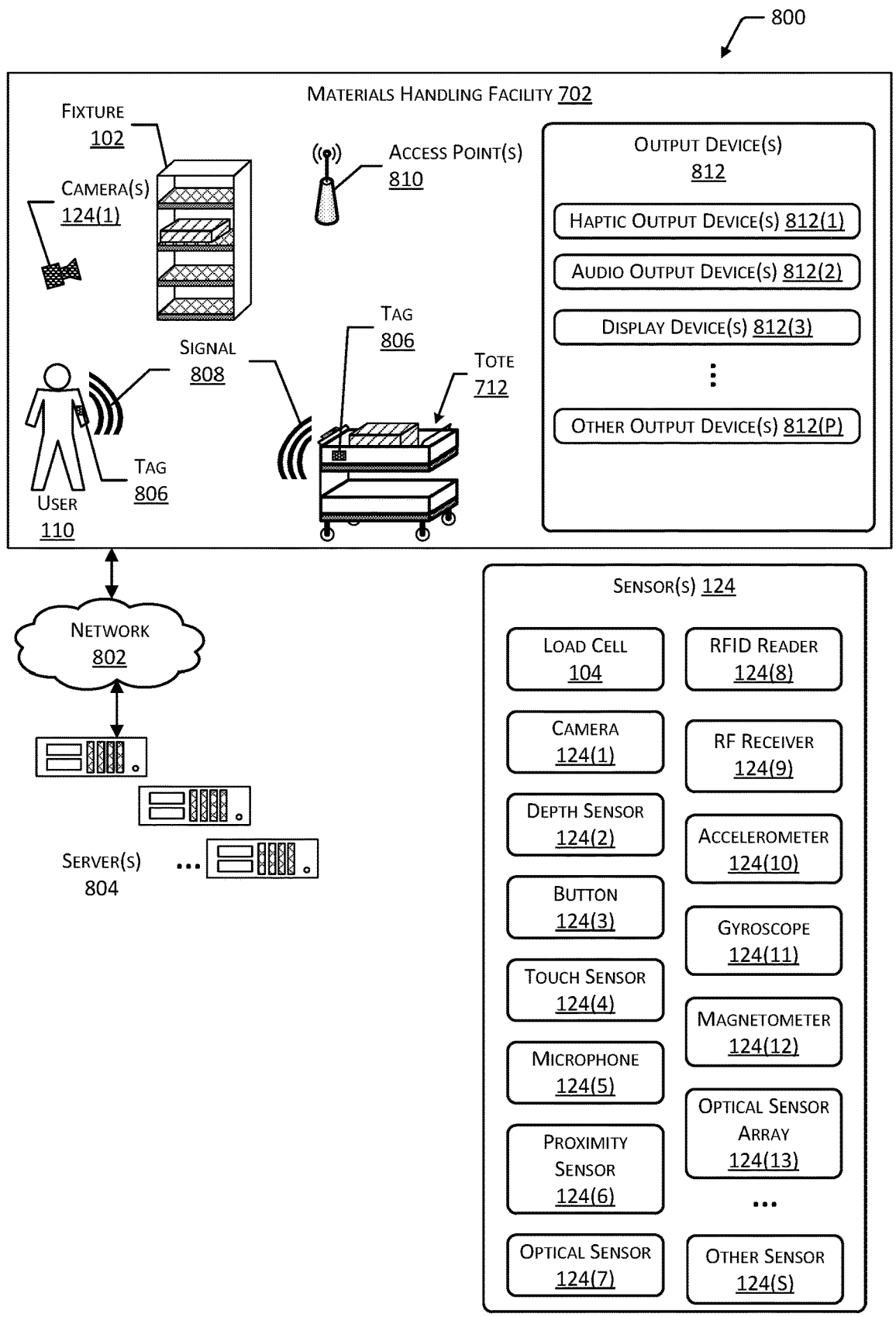
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), wireless infrastructure (e.g., cellular, microwave, satellite, and so forth), or other connection technologies.

The servers 804 may be configured to execute one or more modules or software applications associated with the inventory management system 112 or other systems. While the servers 804 are illustrated as being in a location outside of the facility 702, in other implementations, at least a portion of the servers 804 may be located at the facility 702. The servers 804 are discussed in more detail below with regard to FIG. 9.

The users 110, the totes 712, or other objects in the facility 702 may be equipped with one or more tags 806. The tags 806 may be configured to emit a signal 808. In one implementation, the tag 806 may be a radio frequency identification (RFID) tag 806 configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 112 may be configured to use the tags 806 for one or more of identification of the object, determining a location of the object, and so forth. For example, the users 110 may wear tags 806, the totes 712 may have tags 806 affixed, and so forth, which may be read and, based at least in part on signal strength, used to determine identity and location.

Generally, the inventory management system 112 or other systems associated with the facility 702 may include any number and combination of input components, output components, and servers 804.

The one or more sensors 124 (including the load cells 104) may be arranged at one or more locations within the facility 702. For example, the sensors 124 may be mounted on or within a floor, wall, at a ceiling, at a fixture 102, on a tote 712, may be carried or worn by a user 110, and so forth.

The sensors 124 may include one or more load cells 104. One or more load cells 104 are configured to measure the weight of a load, such as the item 108, the tote 712, or other objects. The load cells 104 may be configured to measure the weight of the load at one or more of the fixtures 102, the tote 712, on the floor of the facility 702, and so forth. For example, the fixture 102 may include a plurality of partitioned areas or platforms, with one or more load cells 104 beneath each partitioned area to provide weight signals about an individual partitioned area or platform. The load cells 104 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of load cells 104 may operate as transducers that generate one or more signals based on an applied force, such as that of the load due to gravity. For example, the load cell 104 may comprise a strain gauge and a structural member that deforms slightly when weight is applied. By measuring a change in the electrical characteristic of the strain gauge, such as capacitance or resistance, the weight may be determined. In another example, the load cell 104 may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 112 may use the data acquired by the load cells 104 to identify an object, determine a change in the quantity of objects, determine a location of an object, maintain shipping records, and so forth.

The sensors 124 may include one or more cameras 124(1) or other imaging sensors. The one or more cameras 124(1) may include imaging sensors configured to acquire images of a scene. The cameras 124(1) are configured to detect light in one or more wavelengths including, but not limited to, terahertz, infrared, visible, ultraviolet, and so forth. The one or more cameras 124(1) may comprise charge coupled devices (CCD), complementary metal oxide semiconductor (CMOS) devices, microbolometers, and so forth. The inventory management system 112 may use image data acquired by the one or more cameras 124(1) during operation of the facility 702. For example, the inventory management system 112 may identify items 108, users 110, totes 712, and so forth, based at least in part on their appearance within the image data acquired by the one or more cameras 124(1). The one or more cameras 124(1) may be mounted in various locations within the facility 702. For example, a camera 124(1) may be mounted overhead, on fixtures 102, may be worn or carried by users 110, may be affixed to totes 712, and so forth.

One or more depth sensors 124(2) may also be included in the sensors 124. The depth sensors 124(2) are configured to acquire spatial or three-dimensional (3D) data, such as depth information, about objects within a field of view. The depth sensors 124(2) may include range cameras, lidar systems, sonar systems, radar systems, structured light systems, stereo vision systems, optical interferometry systems, and so forth. The inventory management system 112 may use the 3D data acquired by the depth sensors 124(2) to identify objects, determine a location of an object in 3D real space, and so forth. One or more buttons 124(3) may be configured to accept input from the user 110. The buttons 124(3) may comprise mechanical, capacitive, optical, or other mechanisms. For example, the buttons 124(3) may comprise mechanical switches configured to accept an applied force from a touch of the user 110 to generate an input signal. The inventory management system 112 may use data from the buttons 124(3) to receive information from the user 110. For example, the tote 712 may be configured with a button 124(3) to accept input from the user 110 and send information indicative of the input to the inventory management system 112.

The sensors 124 may include one or more touch sensors 124(4). The touch sensors 124(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 112 may use data from the touch sensors 124(4) to receive information from the user 110. For example, the touch sensor 124(4) may be integrated with the tote 712 to provide a touchscreen with which the user 110 may select from a menu one or more particular items 108 for picking, enter a manual count of items 108 at a fixture 102, and so forth.

One or more microphones 124(5) may be configured to acquire information indicative of sound present in the environment. In some implementations, arrays of microphones 124(5) may be used. These arrays may implement beamforming techniques to provide for directionality of gain. The inventory management system 112 may use the one or more microphones 124(5) to acquire information from acoustic tags 806, accept voice input from the users 110, determine ambient noise level, and so forth.

The sensors 124 may include proximity sensors 124(6) used to determine presence of an object, such as the user 110, the tote 712, and so forth. The proximity sensors 124(6) may use optical, electrical, ultrasonic, electromagnetic, or other techniques to determine a presence of an object. In some implementations, the proximity sensors 124(6) may use an optical emitter and an optical detector to determine proximity. For example, an optical emitter may emit light, a portion of which may then be reflected by the object back to the optical detector to provide an indication that the object is proximate to the proximity sensor 124(6). In other implementations, the proximity sensors 124(6) may comprise a capacitive proximity sensor 124(6) configured to provide an electrical field and determine a change in electrical capacitance due to presence or absence of an object within the electrical field.

The proximity sensors 124(6) may be configured to provide sensor data indicative of one or more of a presence or absence of an object, a distance to the object, or characteristics of the object. An optical proximity sensor 124(6) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 124 such as a camera 124(1). Based on an apparent distance between the features of the structured light pattern, the distance to the object may be calculated. Other techniques may also be used to determine distance to the object. In another example, the color of the reflected light may be used to characterize the object, such as skin, clothing, tote 712, and so forth.

The sensors 124 may include one or more optical sensors 124(7). The optical sensors 124(7) may be configured to provide data indicative of one or more of color or intensity of light impinging thereupon. For example, the optical sensor 124(7) may comprise a photodiode and associated circuitry configured to generate a signal or data indicative of an incident flux of photons. As described below, the optical sensor array 124(13) may comprise a plurality of the optical sensors 124(7). For example, the optical sensor array 124(13) may comprise an array of ambient light sensors such as the ISL76683 as provided by Intersil Corporation of Milpitas, Calif., USA, or the MAX44009 as provided by Maxim Integrated of San Jose, Calif., USA. In other implementations, other optical sensors 124(7) may be used. The optical sensors 124(7) may be sensitive to one or more of infrared light, visible light, or ultraviolet light. For example, the optical sensors 124(7) may be sensitive to infrared light, and infrared light sources such as LEDs may provide illumination.

The optical sensors 124(7) may include photodiodes, photoresistors, photovoltaic cells, quantum dot photoconductors, bolometers, pyroelectric infrared detectors, and so forth. For example, the optical sensor 124(7) may use germanium photodiodes to detect infrared light.

One or more radio frequency identification (RFID) readers 124(8), near field communication (NFC) systems, and so forth, may be included as sensors 124. For example, the RFID readers 124(8) may be configured to read the RF tags 806. Information acquired by the RFID reader 124(8) may be used by the inventory management system 112 to identify an object associated with the RF tag 806 such as the item 108, the user 110, the tote 712, and so forth. For example, based on information from the RFID readers 124(8) detecting the RF tag 806 at different times and RFID readers 124(8) having different locations in the facility 702, a velocity of the RF tag 806 may be determined.

One or more RF receivers 124(9) may also be included as sensors 124. In some implementations, the RF receivers 124(9) may be part of transceiver assemblies. The RF receivers 124(9) may be configured to acquire RF signals 808 associated with Wi-Fi, Bluetooth, ZigBee, 3G, 4G, 5G, LTE, or other wireless data transmission technologies. In some implementations, the RF receivers 124(9) may detect signals transmitted at frequencies such as below 15 MHz. The RF receivers 124(9) may provide information associated with data transmitted via radio frequencies, signal strength of RF signals 808, and so forth. For example, information from the RF receivers 124(9) may be used by the inventory management system 112 to determine a location of an RF source, such as a communication interface onboard the tote 712.

The sensors 124 may include one or more accelerometers 124(10), which may be worn or carried by the user 110, mounted to the tote 712, and so forth. The accelerometers 124(10) may provide information such as the direction and magnitude of an imposed acceleration. Data such as rate of acceleration, determination of changes in direction, speed, and so forth, may be determined using the accelerometers 124(10). In some implementations, the vibration sensors 106 may include one or more accelerometers 124(10).

A gyroscope 124(11) may provide information indicative of rotation of an object affixed thereto. For example, the tote 712 or other objects may be equipped with a gyroscope 124(11) to provide data indicative of a change in orientation of the object. In some implementations, the vibration sensors 106 may include one or more gyroscopes 124(11).

A magnetometer 124(12) may be used to determine an orientation by measuring ambient magnetic fields, such as the terrestrial magnetic field. The magnetometer 124(12) may be worn or carried by the user 110, mounted to the tote 712, and so forth. For example, the magnetometer 124(12) mounted to the tote 712 may act as a compass and provide information indicative of which direction the tote 712 is oriented. In another example, the vibration sensor 106 may comprise a permanent magnet and a magnetometer 124(12) that is used to detect the strength of the magnetic field from that permanent magnet. As a distance between the magnetometer 124(12) and the magnet varies as a result of vibration, the measured change in magnetic field strength may be indicative of vibration.

An optical sensor array 124(13) may comprise one or optical sensors 124(7). The optical sensors 124(7) may be arranged in a regular, repeating, or periodic two-dimensional arrangement such as a grid. The optical sensor array 124(13) may generate image data. For example, the optical sensor array 124(13) may be arranged within or below a fixture 102 and obtain information about shadows of items 108, hand of the user 110, and so forth.

The sensors 124 may include other sensors 124(S) as well. For example, the other sensors 124(S) may include light curtains, ultrasonic rangefinders, thermometers, barometric sensors, hygrometers, and so forth. For example, the inventory management system 112 may use information acquired from thermometers and hygrometers in the facility 702 to direct the user 110 to check on delicate items 108 stored in a particular fixture 102, which is overheating, too dry, too damp, and so forth.

In one implementation, a light curtain may utilize a linear array of light emitters and a corresponding linear array of light detectors. For example, the light emitters may comprise a line of infrared light emitting diodes (LEDs) or vertical cavity surface emitting lasers (VCSELs) that are arranged above a top shelf in front of the fixture 102, while the light detectors comprise a line of photodiodes sensitive to infrared light arranged below the light emitters. The light emitters produce a "lightplane" or sheet of infrared light that is then detected by the light detectors. An object passing through the lightplane may decrease the amount of light falling upon the light detectors. For example, the user's 110 hand would prevent at least some of the light from light emitters from reaching a corresponding light detector. As a result, a position along the linear array of the object may be determined that is indicative of a touchpoint. This position may be expressed as touchpoint data, with the touchpoint being indicative of the intersection between the hand of the user 110 and the sheet of infrared light. In some implementations, a pair of light curtains may be arranged at right angles relative to one another to provide two-dimensional touchpoint data indicative of a position of touch in a plane. Input from the light curtain, such as indicating occlusion from a hand of a user 110 may be used to trigger acquisition or selection of image data for processing by the analysis module 126.

The other sensors 124(S) may also include an instrumented auto-facing unit (AFU). The instrumented AFU may comprise a position sensor configured to provide data indicative of displacement of a pusher. As an item 108 is removed from the instrumented AFU, the pusher moves, such as under the influence of a spring, and pushes the remaining items 108 in the instrumented AFU to the front of the fixture 102. By using data from the position sensor, and given item data 118 such as a depth of an individual item 108, a count may be determined, based on a change in position data. For example, if each item 108 is 1 inch deep, and the position data indicates a change of 8 inches, the quantity held by the instrumented AFU may have changed by 8 items 108. This count information may be used to confirm or provide a cross check for a count obtained by other means, such as analysis of the image data.

In some implementations, the camera 124(1) or other sensors 124(S) may include hardware processors, memory, and other elements configured to perform various functions. For example, the camera 124(1) may be configured to generate image data, send the image data to another device such as the server 804, and so forth.

The facility 702 may include one or more access points 810 configured to establish one or more wireless networks. The access points 810 may use Wi-Fi, NFC, Bluetooth, or other technologies to establish wireless communications between a device and the network 802. The wireless networks allow the devices to communicate with one or more of the sensors 124, the inventory management system 112, the optical sensor arrays 124(13), the tags 806, a communication device of the tote 712, or other devices.

Output devices 812 may also be provided in the facility 702. The output devices 812 are configured to generate signals, which may be perceived by the user 110 or detected by the sensors 124. In some implementations, the output devices 812 may be used to provide illumination of the optical sensor array 124(13).

Haptic output devices 812(1) are configured to provide a signal that results in a tactile sensation to the user 110. The haptic output devices 812(1) may use one or more mechanisms such as electrical stimulation or mechanical displacement to provide the signal. For example, the haptic output devices 812(1) may be configured to generate a modulated electrical signal, which produces an apparent tactile sensation in one or more fingers of the user 110. In another example, the haptic output devices 812(1) may comprise piezoelectric or rotary motor devices configured to provide a vibration, which may be felt by the user 110.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 110 or detected by a light-sensitive sensor such as a camera 124(1) or an optical sensor 124(7). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located on fixtures 102, totes 712, on the floor of the facility 702, and so forth.

Other output devices 812(P) may also be present. For example, the other output devices 812(P) may include scent/odor dispensers, document printers, 3D printers or fabrication equipment, and so forth.

Figure 9:
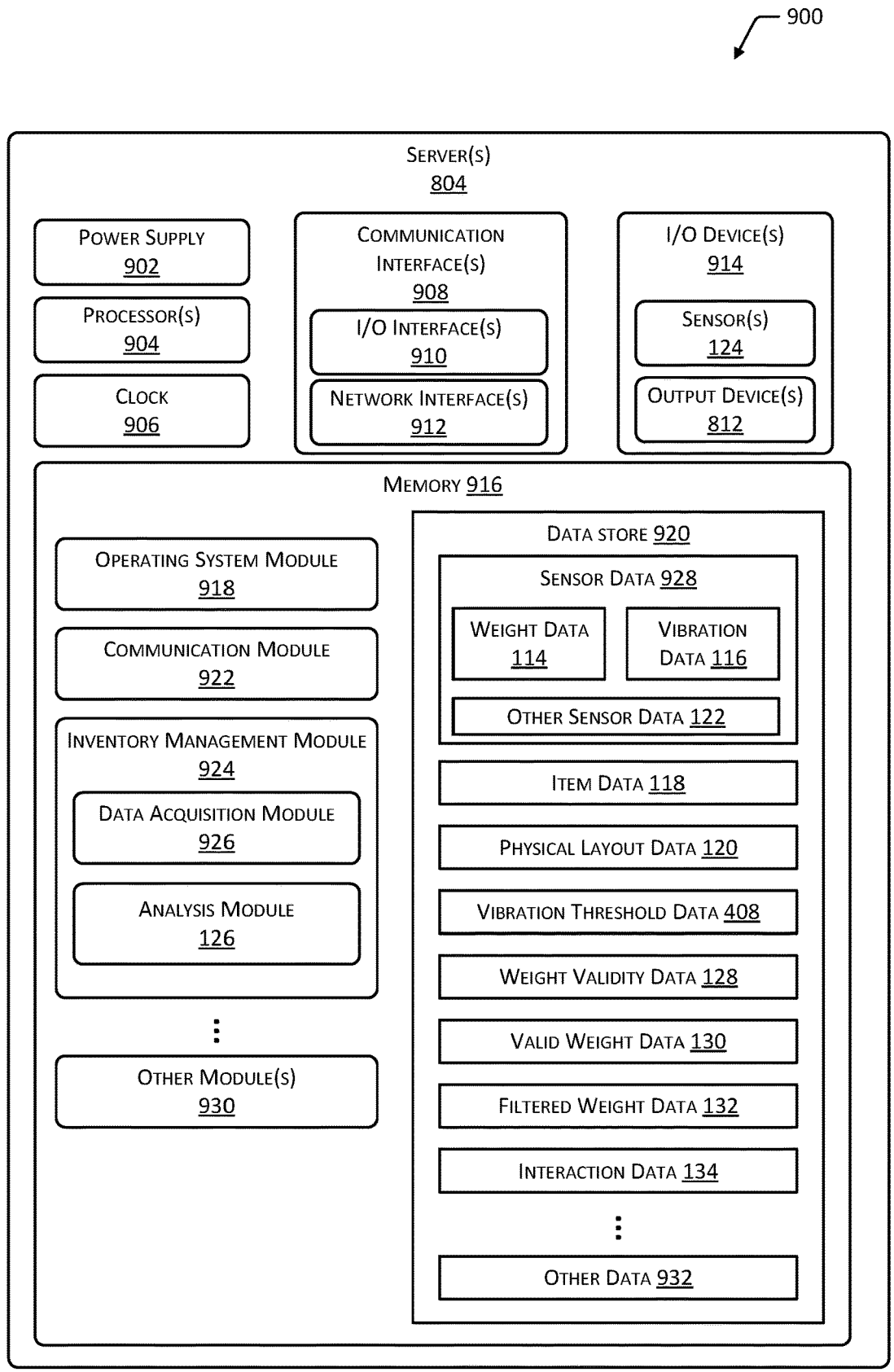
FIG. 9 is a block diagram of a server to support operation of the facility, according to some implementations.

FIG. 9 illustrates a block diagram 900 of a server 804 configured to support operation of the facility 702, according to some implementations. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 124, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, such as the totes 712, routers, access points 810, and so forth. The network interfaces 912 may include devices configured to couple to personal area networks (PANs), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 804, network attached storage devices, and so forth.

A communication module 922 may be configured to establish communications with one or more of the totes 712, sensors 124, display devices 812(3), other servers 804, or other devices. The communications may be authenticated, encrypted, and so forth.

The memory 916 may store an inventory management module 924. The inventory management module 924 is configured to provide the inventory functions as described herein with regard to the inventory management system 112. For example, the inventory management module 924 may track items 108 between different fixtures 102, to and from the totes 712, and so forth. The inventory management module 924 may access sensor data 928. The sensor data 928 may include the weight data 114, non-weight data, such as obtained from other sensors 124 such as cameras 124(1), depth sensors 124(2), and so forth.

The data store 920 may store other data such as the item data 118, physical layout data 120, vibration threshold data 408, weight validity data 128, valid weight data 130, filtered weight data 132, interaction data 134, and so forth.

The inventory management module 924 may include one or more of a data acquisition module 926 and the analysis module 126. The data acquisition module 926 may be configured to acquire and access information associated with operation of the facility 702. For example, the data acquisition module 926 may be configured to acquire sensor data 928, such as the weight data 114, the vibration data 116, the other sensor data 122, and so forth.

The analysis module 126 may operate as described above, and is configured to generate interaction data 134. The analysis module 126 may process other non-weight data, such as the image data 210.

Processing of image data 210 may be performed by an image processing module implementing, at least in part, one or more of the following tools or techniques. In one implementation, processing of the image data 210 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data 210. In still another implementation, functions such as those in the Machine Vision Toolbox for Matlab (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 928 or other data. For example, the ANN may be a trained using a supervised learning algorithm such that object identifiers are associated with images of particular objects within training images provided to the ANN. Once trained, the ANN may be provided with the sensor data 928 to determination of similarity between two or more images, provide object identification, and so forth.

Other modules 930 may also be present in the memory 916 as well as other data 932 in the data store 920. For example, the other modules 930 may include an accounting module while the other data 932 may include billing data. The accounting module may be configured to assess charges to accounts associated with particular users 110 or other entities, while the billing data may include information such as payment account numbers.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a shelf;
a load cell configured to measure weight of at least a portion of a load on the shelf;
a vibration sensor comprising a gyroscope mounted to the shelf;
a communication interface; and
a computing device comprising:
a first memory storing first computer-executable instructions; and
a first hardware processor to execute the first computer-executable instructions to:
acquire first weight data from the load cell during a first interval;
acquire second weight data from the load cell during a second interval;
acquire first vibration data from the vibration sensor during the first interval;
acquire second vibration data from the vibration sensor during the second interval;
determine a first vibration value using the first vibration data;
determine the first vibration value exceeds a threshold value;
designate the first weight data occurring at the first interval and for a duration of time thereafter as invalid weight data;
determine a second vibration value using the second vibration data;
determine the second vibration value is less than or equal to the threshold value; and
send the second weight data to a server using the communication interface.

2. The system of claim 1, further comprising:
a support structure; and
wherein a back of the shelf is attached to the support structure, a front of the shelf is distal to the support structure, and the vibration sensor is mounted proximate to the front of the shelf.

3. A system comprising:
a fixture comprising a shelf;
one or more load cells configured to measure weight of at least a portion of the fixture;
a first vibration sensor mounted proximate to a front of the shelf;
a communication interface; and
a computing device comprising:
a first memory storing first computer-executable instructions; and
a first hardware processor to execute the first computer-executable instructions to:
access weight data from the one or more load cells;
access vibration data from the first vibration sensor;
determine a vibration threshold value; and
determine validity data indicative of validity of at least a portion of the weight data based on a comparison of the vibration data and the vibration threshold value.

4. The system of claim 3, wherein the first vibration sensor comprises one or more of a piezoelectric element, a gyroscope, an accelerometer, an optical vibrometer, or a mechanical vibrometer.

5. The system of claim 3, further comprising a second vibration sensor that is one or more of affixed to or at least partially within a floor.

6. The system of claim 3, wherein the fixture further comprises a second shelf and a second vibration sensor, and further wherein the second vibration sensor is mounted proximate to a front of the second shelf.

7. The system of claim 3, wherein the fixture comprises:
a support structure;
the shelf supported by the one or more load cells is attached to the support structure; and
wherein a second vibration sensor is mounted on the support structure.

8. The system of claim 3, further comprising a server, the server comprising:
a second memory storing second computer-executable instructions; and
a second hardware processor to execute the second computer-executable instructions to:
receive the weight data;
receive the vibration data;
determine a vibration value using at least a portion of the vibration data; and
based on the vibration value, determine validity of the at least a portion of the weight data.

9. The system of claim 8, the second computer-executable instructions to determine the vibration value further comprising instructions to:
determine the at least a portion of the weight data was obtained contemporaneously with the at least a portion of the vibration data.

10. The system of claim 8, wherein the vibration data comprises a plurality of values that are indicative of one or more of rotation, velocity, acceleration, or displacement; and
the second computer-executable instructions to determine the vibration value further comprising instructions to:
calculate a root mean square of the plurality of values.

11. The system of claim 3, further comprising a server, the server comprising:
a second memory storing second computer-executable instructions; and
a second hardware processor to execute the second computer-executable instructions to:
receive the weight data;
receive the vibration data;
determine a vibration value using at least a portion of the vibration data;
determine a time interval associated with the at least a portion of the vibration data; and
apply a filter to the weight data that corresponds to the time interval to generate filtered weight data.

12. The system of claim 11, the filter further comprising a notch filter that attenuates values of a portion of the weight data that exhibits values representative of vibration within a particular frequency range; and
wherein the filtered weight data comprises weight data in which the values representative of the vibration within the particular frequency range have a lower amplitude than in the weight data.

13. The system of claim 12, the server further comprising:
the second memory storing third computer-executable instructions; and
the second hardware processor to execute the third computer-executable instructions to:
generate interaction data at least in part using the filtered weight data.

14. The system of claim 3, further comprising a server, the server comprising:
- a second memory storing second computer-executable instructions; and
- a second hardware processor to execute the second computer-executable instructions to:
  - determine a location of the first vibration sensor as mounted proximate to the front of the shelf;
  - receive the weight data;
  - receive the vibration data;
  - determine a vibration value using at least a portion of the vibration data;
  - determine the vibration threshold value based on the location; and
  - compare the vibration value to the vibration threshold value.

15. A method comprising:
- accessing weight data indicative of a weight on at least a portion of a fixture, wherein the fixture comprises a shelf and a support structure, and wherein the weight data is obtained from a load cell;
- accessing vibration data indicative of vibration of the at least a portion of the fixture, wherein the vibration data is obtained from a sensor mounted to a front edge of the shelf of the fixture or mounted to the support structure of the fixture;
- determining a vibration value using the vibration data; and
- determining validity of the weight data based on the vibration value.

16. The method of claim 15, the determining the vibration value comprising calculating a root mean square of a plurality of one or more values indicative of one or more of rotation, velocity, acceleration, or displacement.

17. The method of claim 15, further comprising:
- determining a total weight measured by the load cell;
- determining a threshold value based on the total weight; and
- wherein the determining the validity of the weight data comprises comparing the vibration value to the threshold value.

18. The method of claim 15, further comprising:
- determining a type of the fixture, wherein the type is indicative of construction of the fixture;
- determining a threshold value based on the type of the fixture; and
- wherein the determining the validity of the weight data comprises comparing the vibration value to the threshold value.

19. The method of claim 15, wherein at least a portion of the vibration data is obtained at least in part contemporaneously with at least a portion of the weight data.

20. The method of claim 15, further comprising:
- determining the vibration value exceeds a threshold value;
- determining a duration of time; and
- designating the weight data occurring at a first time and for the duration of time thereafter as invalid weight data.

21. The method of claim 20, wherein the determining the duration of time is based on one or more of:
- construction of the fixture,
- previously determined total weight on the fixture, or
- placement of the sensor with respect to the fixture.

* * * * *